(12) United States Patent
Ninomiya

(10) Patent No.: US 7,299,072 B2
(45) Date of Patent: Nov. 20, 2007

(54) APPARATUS FOR TIME DIVISION MULTI-SECTOR WIRELESS LAN

(75) Inventor: Teruhisa Ninomiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 403 days.

(21) Appl. No.: 10/763,207

(22) Filed: Jan. 26, 2004

(65) Prior Publication Data
US 2004/0171407 A1    Sep. 2, 2004

(30) Foreign Application Priority Data
Feb. 28, 2003    (JP)  ............................. 2003-054511

(51) Int. Cl.
*H04Q 7/20* (2006.01)
*H04M 1/00* (2006.01)
(52) U.S. Cl. .................. 455/562.1; 455/561; 455/422.1
(58) Field of Classification Search ............. 455/422.1, 455/562.1, 561; 370/320, 321
See application file for complete search history.

(56) References Cited

U.S. PATENT DOCUMENTS

| | | | | |
|---|---|---|---|---|
| 4,672,656 A | * | 6/1987 | Pfeiffer et al. | ............... 455/410 |
| 5,021,801 A | * | 6/1991 | Smith et al. | ................. 343/876 |
| 5,295,153 A | * | 3/1994 | Gudmundson | ............... 455/450 |
| 5,539,925 A | * | 7/1996 | Yli-Kotila et al. | ............. 455/68 |
| 5,999,818 A | * | 12/1999 | Gilbert et al. | ............... 455/448 |
| 6,188,903 B1 | * | 2/2001 | Gardner et al. | .............. 455/447 |
| 6,754,504 B1 | * | 6/2004 | Reed | ........................ 455/456.2 |

(Continued)

FOREIGN PATENT DOCUMENTS

| | | |
|---|---|---|
| JP | 09-026172 | 1/1977 |
| JP | 05-145470 | 6/1993 |
| JP | 2000-13870 | 1/2000 |
| JP | 2000-59287 | 2/2000 |
| JP | 2001-309424 | 11/2001 |

OTHER PUBLICATIONS

Suzuki, M. et al., "Sector Layout Strategy for Interface Reduction in Orthogonal CDMA Cellular Systems", Review of the Communications Research Laboratory, vol. 42, No. 2, Jun. 1996, pp. 261-268.

(Continued)

*Primary Examiner*—Lester G. Kincaid
*Assistant Examiner*—Marisol Figueroa
(74) *Attorney, Agent, or Firm*—Staas & Halsey LLP

(57) ABSTRACT

An apparatus for a wireless base station is adapted to communicate with a plurality of wireless terminals in a plurality of sectors and comprises a communication control unit, and a plurality of transceivers associated with the sectors, respectively. The transceivers have respective directive antennas associated with the respective sectors. During a first period of time, the communication control unit enables one or more of the plurality of transceivers that are associated with respective one or more of the plurality of sectors that are not adjacent to each other, to communicate with wireless terminals, and the communication control unit disables remaining one or more transceivers other than the enabled one or more transceivers, from communicating with wireless terminals. During a second period of time subsequent to the first period of time, the communication control unit enables further one or more of the plurality of transceivers that are associated with respective further one or more of the plurality of sectors that are not adjacent to each other, to communicate with wireless terminals, and the control unit disables further remaining one or more transceivers other than the enabled further one or more transceivers, from communicating with wireless terminals.

8 Claims, 8 Drawing Sheets

U.S. PATENT DOCUMENTS

| | | | |
|---|---|---|---|
| 7,039,358 B1* | 5/2006 | Shellhammer et al. | 455/41.2 |
| 2002/0132644 A1* | 9/2002 | Mellor et al. | 455/562 |
| 2003/0109265 A1* | 6/2003 | Yamamoto et al. | 455/456 |
| 2004/0163024 A1* | 8/2004 | Kawai et al. | 714/748 |
| 2004/0196800 A1* | 10/2004 | Padovani et al. | 370/321 |

OTHER PUBLICATIONS

Yano, T., et al., "Integrated Wireless LAN Access System (1)", Institute of Electronic, Information, and Communication Engineers Society Conference, 2002.

Tamaki, T., et al., "Integrated Wireless LAN Access System (2)", Institute of Electronic, Information, and Communication Engineers Society Conference, 2002.

Uta, T., et al., "Integrated Wireless LAN Access System (3)", Institute of Electronic, Information, and Communication Engineers Society Conference, 2002.

Shimokawa, I., et al., "Integrated Wireless LAN Access System (4)", Institute of Electronic, Information, and Communication Engineers Society Conference, 2002.

Communication from the Japanese Patent Office mailed May 30, 2006.

* cited by examiner

LOCATION MANAGEMENT TABLE

| SECTORS # | TERMINAL ID CODES |
|---|---|
| #1 | T21 |
| #2 | T22, T23 |
| #3 | T24, T25 |
| #4 | T26 |
| #5 | T27, T28 |
| #6 | T29 |
| #7 | T30, T31 |
| #8 | T32, T33 |

LIST OF TERMINALS WHOSE LOCATIONS ARE NOT KNOWN

| |
|---|
| T34 |
| T35 |
| T36 |

P 0   ALL-SECTOR COMMUNICATION

P 1   ODD-NUMBERED SECTOR         P 2   EVEN-NUMBERED SECTOR
      COMMUNICATION                     COMMUNICATION

FIG. 4B                              FIG. 4C

TIME

APPARATUS FOR TIME DIVISION MULTI-SECTOR WIRELESS LAN

FIELD OF THE INVENTION

The present invention relates to a wireless local area network (LAN), and more particularly to a multi-sector wireless LAN.

BACKGROUND OF THE INVENTION

A wireless LAN in compliance with IEEE 802.11 standard, for example, has a problem in that, when a server or the like on a wired LAN communicates with a mobile wireless terminal over the wireless LAN, the frequency band to be used by a wireless base station or access point (AP) is narrower than that of the wired LAN. In a wired LAN in compliance with 100 Base-T, the maximum transmission rate is 100 Mbps, and the maximum effective transmission rate is about 80 to 90 Mbps. In contrast, in a wireless LAN employing the OFDM scheme in the 5.2 GHz band in compliance with IEEE 802.11a, the maximum transmission rate is 54 Mbps, and the maximum effective transmission rate is about 20 Mbps. In a wireless LAN employing the spread spectrum scheme of 2.4 GHz band in compliance with IEEE 802.11b, which is most widely used, the maximum transmission rate is 11 Mbps, and the maximum effective transfer rate is about 5 Mbps.

It is known that, in order to address the problem above, an area covered by the base station is divided into a plurality of respective small sectors with a plurality of respective directive antennas of the base station. As long as the sectors are completely separated from one another and are not subject to interference with one another, the separate communications in the respective sectors can be provided concurrently, and the throughput of each terminal in each sector is improved. In the mobile communication system, the frequencies allocated to the respective sectors are typically adjusted between the adjacent sectors to reduce interference between the adjacent sectors. In the wireless LAN, however, the number of channels available without causing interference is limited, and hence it is not desirable to allocate a plurality of channels to one base station.

Kawabata et al. in Japanese Patent Publication JP-A-2000-59287 laid-open on Feb. 25, 2000, for example, disclose a mobile wireless communication system which includes wireless base stations and terminal stations provided with respective directive antennas. The base station has a directivity determining pattern for setting the directivity of its antenna in accordance with timings. Neighboring base stations using the same frequency use different directivity determining patterns. Remote base stations repeatedly use the same directivity determining patterns. The directivity determining patterns are determined by associating the directivities of the antennas with timings which have been derived by equally dividing the frames of communication channels by the number of directivity determining patterns.

Toshimitsu et al. in Japanese Patent Publication JP-A-2001-309424 laid-open on Nov. 2, 2001, for example, disclose a wireless base station which transfers signals in the form of time-division multiplexed frames to and from a plurality of wireless terminals. The wireless base station includes: a beam forming section which simultaneously forms a plurality of spatially divided beams, a plurality of antenna elements for radiating the beams toward the terminals to transfer signals to and from the terminals, and a scheduling processing section for allocating communication bands to the respective wireless terminals for a plurality of frames corresponding to at least one of the beams in a manner to avoid mutual interference between the signals to be transferred in different frames.

Yano et al., Communication Society Conference of The Institute of Electronics, Information and Communication Engineers 2002, B-8-186 to 189, pp.483-486, proposes integral management of a plurality of base stations having respective directive beams, so that the throughput is improved while avoiding interference between the base stations. In this case, however, the protocol of the wireless LAN is specialized, and hence existing terminals can not access the base stations.

The inventor has recognized that the throughput per wireless terminal can be improved, by dividing an area covered by a wireless base station into a plurality of sectors, causing the base station using respective directive antennas to communicate with the wireless terminals in the respective sectors, and allocating communications to the adjacent sectors in a time divisional manner.

An object of the invention is to increase the throughput per terminal in a wireless LAN.

Another object of the invention is to enable a larger number of wireless terminals over a wireless LAN to communicate with a base station in a narrow frequency band.

SUMMARY OF THE INVENTION

In accordance with an aspect of the present invention, an apparatus for a wireless base station is adapted to communicate with a plurality of wireless terminals in_a_plurality of sectors, and comprises a communication control unit, and a plurality of transceivers associated with the sectors, respectively. The transceivers have respective directive antennas associated with the respective sectors. During a first period of time, the communication control unit enables one or more of the plurality of transceivers that are associated with respective one or more of the plurality of sectors that are not adjacent to each other, to communicate with wireless terminals, and the communication control unit disables remaining one or more transceivers other than the enabled one or more transceivers, from communicating with wireless terminals. During a second period of time following the first period of time, the communication control unit enables further one or more of the plurality of transceivers that are associated with respective further one or more of the plurality of sectors that are not adjacent to each other, to communicate with wireless terminals, in which the further one or more transceivers are disabled in the first period of time from communicating, and the communication control unit disables further remaining one or more transceivers other than the enabled further one or more transceivers, from communicating with wireless terminals.

In accordance with another aspect of the invention, a wireless terminal adapted to communicate with a wireless base station in any one of a plurality of sectors, the wireless terminal comprises a control unit for communicating with the wireless base station during a first period of time, receiving a packet containing a description representative of a length of a second period of time subsequent to the first period of time, and for disabling transmission during the second period of time.

The invention also relates to a program for an apparatus in such a wireless base station.

The invention also relates to a method for communication in such a wireless base station.

The invention also relates to a method for communication in such a wireless terminal.

According to the invention, the throughput per terminal can be increased in a wireless LAN, and a larger number of wireless terminals over a wireless LAN can communicate with a base station in a narrow frequency band.

Throughout the drawings, similar symbols and numerals indicate similar items and functions.

BRIEF DESCRIPTION OF THE DRAWINGS

FIGS. 4A to 4C show three different communication patterns established between the wireless base station and the wireless terminals in the sectors;

DETAILED DESCRIPTION OF THE PREFERRED EMBODIMENTS

Figure 1A:
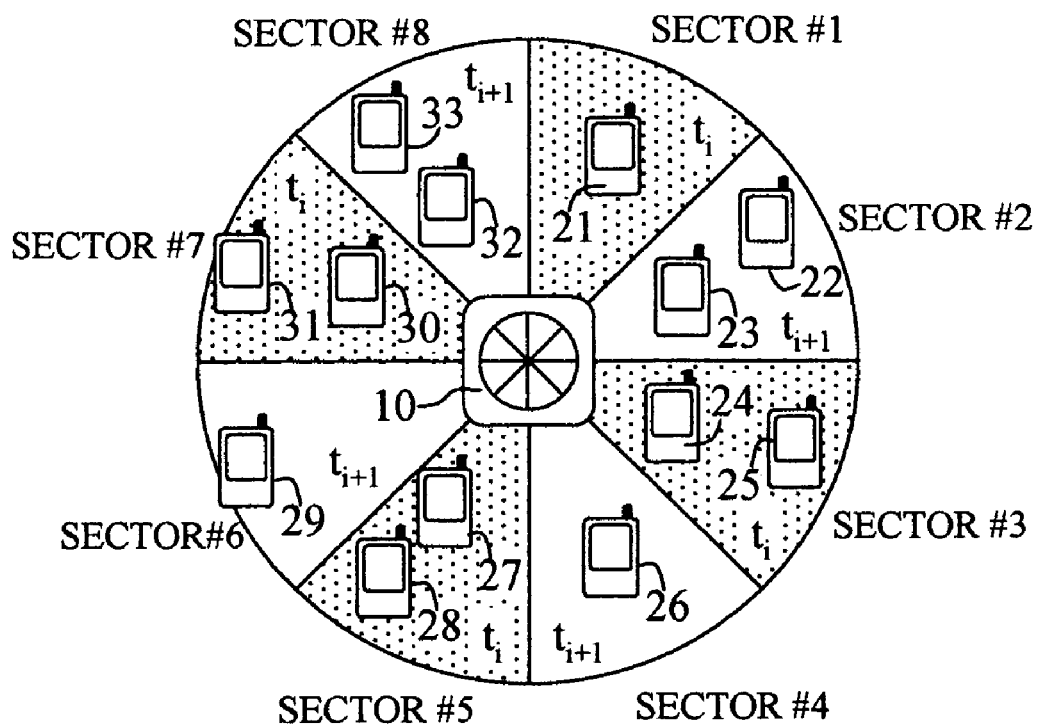
FIG. 1A shows a wireless LAN in accordance with the principle of the present invention.

FIG. 1A shows a wireless LAN in accordance with the principle of the present invention. The wireless LAN is comprised of a wireless base station or access point (AP) 10, and a plurality of mobile wireless terminals or stations 21, 22, . . . and 33, such as personal digital assistants (PDAs) or notebook personal computers (PC). The wireless base station 10 pre-divides an outdoor or indoor area in which it communicates with the mobile wireless terminals 21 to 33, into an even number 2N, e.g. eight, of sectors #1, #2, . . . and #8 with respect to the angle. The wireless base station allocates its separate wireless or radio transceivers having respective directive antennas to the sectors, respectively. For example, in one channel of the 2.4 GHz band in compliance with IEEE 802.11b, or in one channel of the 5.2 GHz band in compliance with IEEE 802.11a, the wireless base station communicates with the mobile wireless terminals 21 to 33 in the sectors #1 to #8.

Figure 1B:
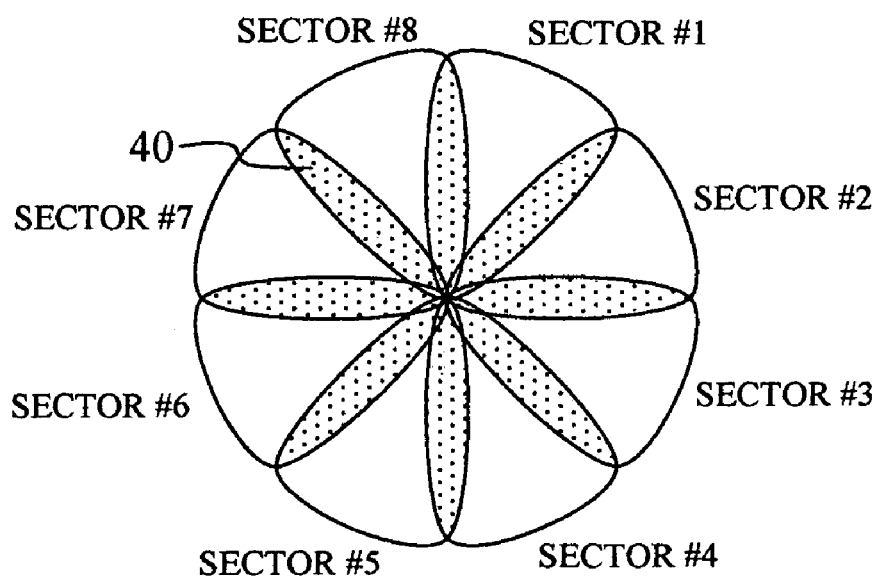
FIG. 1B shows overlaps between the ranges of coverage of transceivers of a wireless base station, each overlap appearing in the vicinity of a boundary between two adjacent ones of sectors.

FIG. 1B shows overlaps 40 between the ranges of coverage of the transceivers of the wireless base station 10, each overlap appearing in the vicinity of a boundary between two different adjacent ones of the sectors #1 to #8. Thus, when the wireless base station 10, using all of the directive antennas, simultaneously and independently communicates with the mobile wireless terminals 21 to 33 in all of the sectors, RF signals may be subject to interference, disturbance or crosstalk in the overlaps 40.

In accordance with the invention, the wireless base station 10 is set to be in an enabled mode of communication during one period of time ti for odd-numbered sectors which are not adjacent to each other, to communicate with the mobile wireless terminals 21, 24, 25, 27, 28, 30 and 31, and it is set to be in an enabled mode of communication during another period of time $t_{i+1}$ for even-numbered sectors which are not adjacent to each other, to communicate with the mobile wireless terminals 22, 23, 26, 29, 32 and 33. This prevents RF signals from being subject to interference, disturbance or crosstalk, which may occur in the communication with the wireless terminals in the overlaps 40 between the adjacent sectors. Thus the wireless base station 10 can simultaneously communicate with the wireless terminals in the plurality, N, of sectors in the same frequency band.

As long as the interference does not occur between the sectors which are not adjacent to each other or every second sectors, the number of sectors can be determined to be larger as the total number of wireless terminals becomes larger, to thereby allow the wireless base station 10 to communicate with a larger number of wireless terminals in the same frequency band. When interference occurs even between every second sectors, the communications may be simultaneously implemented in a set of every third sectors during one period of time. In this case, during a subsequent period of time, the communications may be simultaneously implemented in another set of every third sectors, and, during a further subsequent period of time, the communications may be simultaneously implemented in a further set of every third sectors.

Figures 2A, 2B, 2C:
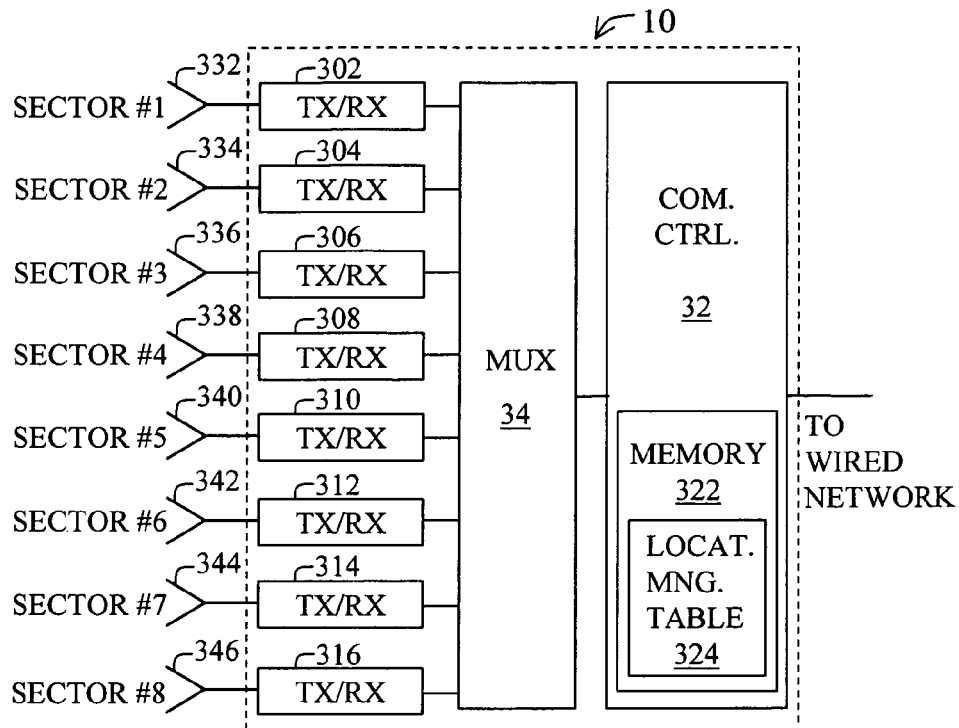
FIG. 2A shows a configuration of the wireless base station.
FIG. 2B shows a location management table in FIG. 2A.
FIG. 2C shows a list of wireless terminals, from which identification codes are not received by a communication control unit, or whose current locations in the sectors are not known by the communication control unit.

FIG. 2A shows the configuration of the wireless base station 10. The wireless base station 10 includes: a communication control unit 32 which is connected to a wired network, such as a wired LAN connected to a server; a multiplexer/demultiplexer 34 which is connected to the communication control unit 32; and a plurality of wireless transceivers 302, 304, . . . and 316 which are connected to the multiplexer/demultiplexer 34. The transceivers 302, 304, . . . and 316 are coupled to respective directive antennas 332, 334, . . . and 346. The directive antennas 332, 334, . . . and 346 are associated with the sectors #1, #2, . . . and #8, respectively. The communication control unit 32 stores a location management table 324 in its memory 322.

FIG. 2B shows the location management table 324 in FIG. 2A. In accordance with determination by the communication control unit 32, identification codes T21 to T33 of the wireless terminals are associated with the different sectors #1 to #8 in accordance their locations in terms of the sectors, and then are stored in the table 324 of FIG. 2B.

FIG. 2C shows a list of wireless terminals 34, 35 and 36, from which the communication control unit 32 has not received identification codes, or whose current locations in the sectors are not known by the communication control unit 32. The communication control unit 32 stores this list together with the location management table 324 into the memory 322.

Figure 3:
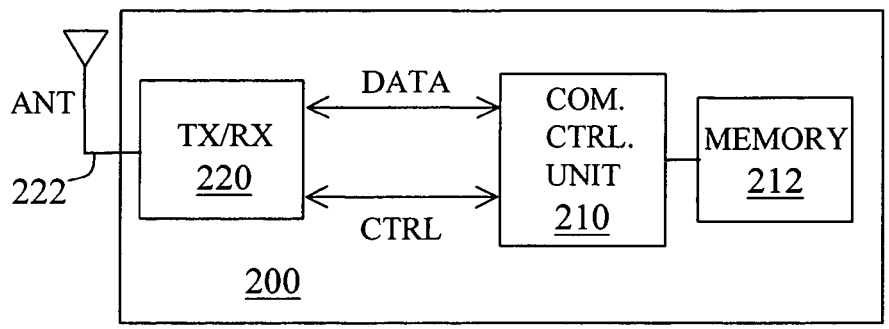
FIG. 3 shows a configuration of each of the mobile wireless terminals.

FIG. 3 shows the configuration of each of the mobile wireless terminals 21 to 33 designated as 200. The wireless terminal 200 includes: a communication control unit 210 coupled to a memory 212; and a wireless transceiver 220 which transmits and receives data and a control signal to and from the communication control unit 210, and which transmits and receives an RF signal to and from the base station 10 via an antenna 222.

Figure 4A:
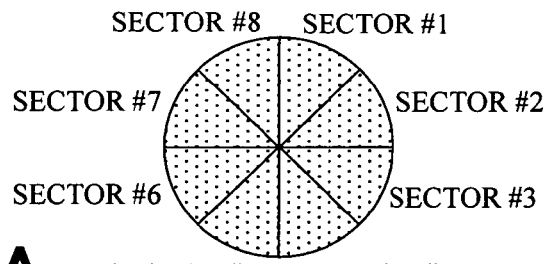
Figure 4D:
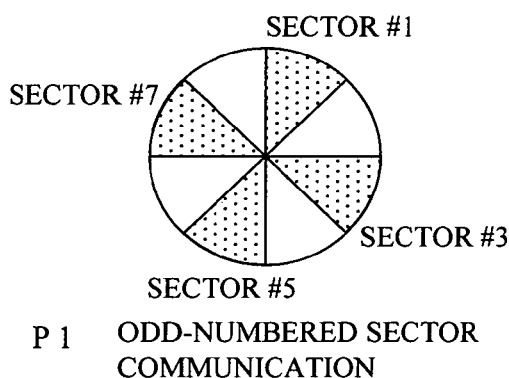
FIG. 4D shows a time chart of the three communication patterns.
Figure 4D:
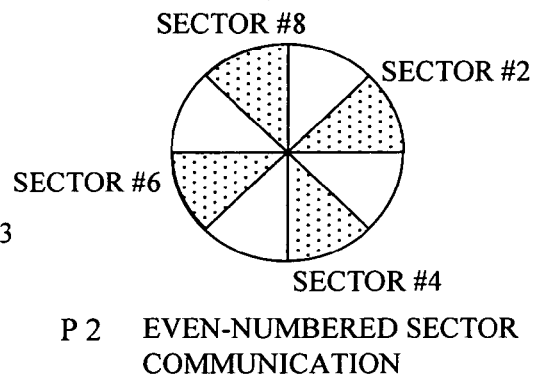
Figure 4D:
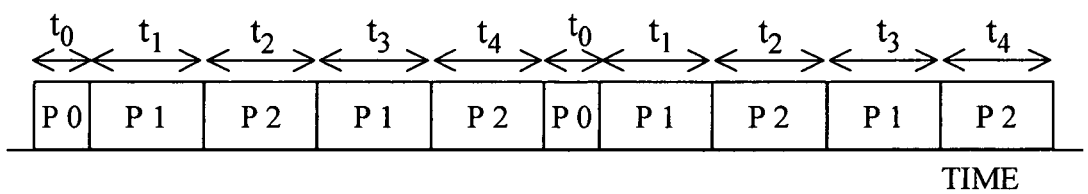

FIGS. 4A to 4C show three different communication patterns established between the wireless base station 10 and the wireless terminals 21 to 33 in the sectors #1 to #8. FIG. 4D is a time chart of the three communication patterns.

During a first period of time $t_0$ in FIG. 4D, the communication pattern P0 of FIG. 4A is established, and all of the sectors #1 to #8 are caused to be in an enabled mode of communication, so that all of the transceivers 302 to 316 of the wireless base station 10 are enabled to communicate with the wireless terminals 21 to 33. In this enabled mode of all-sector communication, the communication control unit 32 of the wireless base station 10 sequentially communicates with all of the wireless terminals 21 to 33, to determine locations of the wireless terminals 21 to 33 in the sectors.

During a second period of time $t_1$ in FIG. 4D, the communication pattern P1 of FIG. 4B is established, and the every second, odd-numbered sectors #1, #3, #5 and #7 are caused to be in the enabled mode of communication, so that the odd-numbered transceivers 302, 306, 310 and 314 of the wireless base station 10 are enabled to communicate with the wireless terminals 21, 24, 25, 27, 28, 30 and 31. During the second period of time $t_1$, the even-numbered sectors #2, #4, #6 and #8 are caused to be in a disabled mode of communication, so that the communication control unit 32 disables the even-numbered transceivers 304, 308, 312 and 316 of the wireless base station 10 from communicating with the wireless terminals 22, 23, 26, 29, 32 and 33.

During a third period of time $t_2$ in FIG. 4D, the communication pattern P2 of FIG. 4C is established, and the every second, even-numbered sectors #2, #4, #6 and #8 are caused to be in the enabled mode of communication, so that the even-numbered transceivers 304, 308, 312 and 316 of the wireless base station 10 are enabled to communicate with the wireless terminals 22, 23, 26, 29, 32 and 33. During the third period of time $t_2$, the odd-numbered sectors #1, #3, #5 and #7 are caused to be in the disabled mode of communication, so that the communication control unit 32 disables the odd-numbered transceivers 302, 306, 310 and 314 of the wireless base station 10 from communicating with the wireless terminals 21, 24, 25, 27, 28, 30 and 31.

During a fourth period of time $t_3$, the communication pattern P1 of FIG. 4B similar to that during the second period of time $t_1$ is established again in the sectors #1 to #8. During a fifth period of time $t_4$, the communication pattern P2 similar to that during the third period of time $t_2$ is established again in the sectors #1 to #8. The sequence of the communication patterns P1 and P2 of FIGS. 4B and 4C may be sequentially repeated once or more. When a wireless terminal is moved from one sector to another sector, the other sector in which the wireless terminal is located is identified in the enabled mode of all-sector communication (P0) of FIG. 4A during the next period of time $t_0$, whereby the moved wireless terminal is enabled to communicate with the base station 10.

Thus the pattern P1 which represents a combination of the enabled mode of communication in the odd-numbered sectors #1, #3, #5 and #7 with the disabled mode of communication in the even-numbered sectors #2, #4, #6 and #8, and the other pattern P2 which represents a combination of the disabled mode of communication in the odd-numbered sectors #1, #3, #5 and #7 in combination with the enabled mode of communication in the even-numbered sectors #2, #4, #6 and #8 are sequentially and alternately produced. Thus, the RF signals can be prevented from being subject to interference, disturbance and crosstalk in the vicinity of the boundary between the adjacent sectors.

Figure 5:
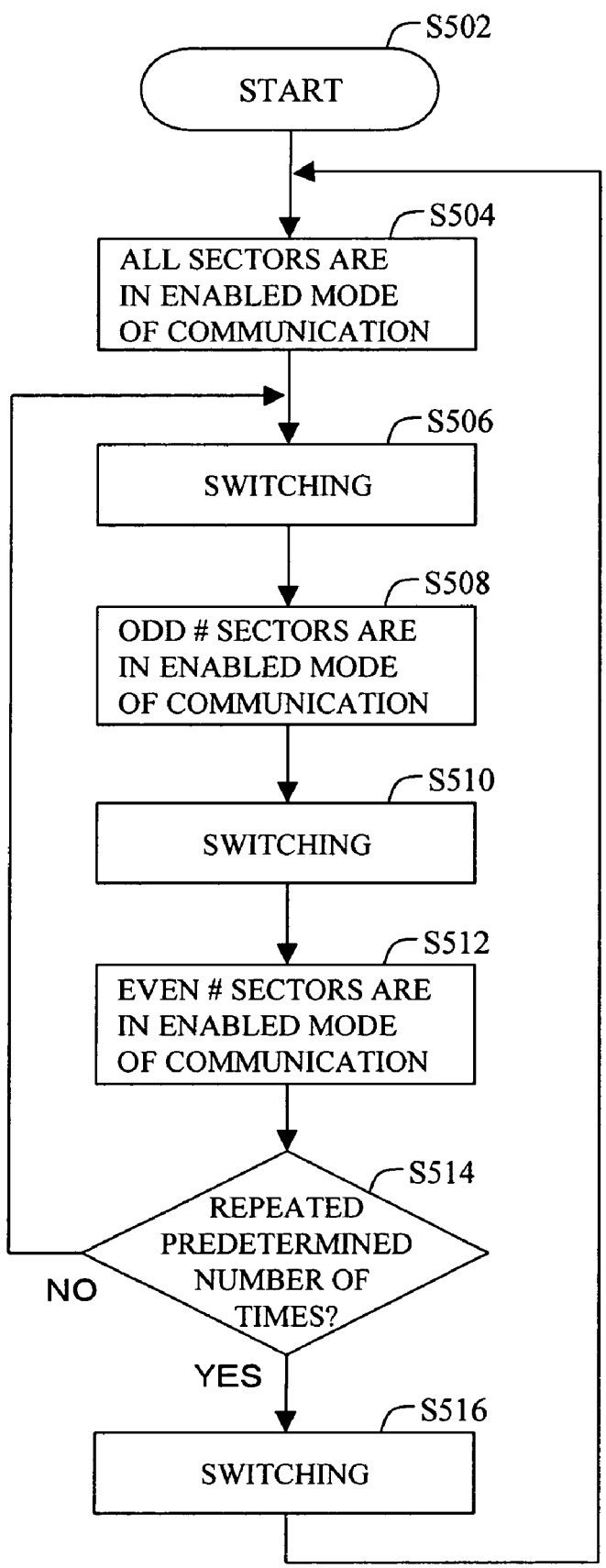
FIG. 5 shows a communication procedure for the time-division multi-sector wireless LAN which is implemented by the communication control unit of the wireless base station, in accordance with the invention.

FIG. 5 shows a communication procedure for the time-division multi-sector wireless LAN which is implemented by the communication control unit 32 of the wireless base station 10, in accordance with the invention. At Step 502, the communication control unit 32 starts the time-division multi-sector wireless LAN communication. At Step 504, the communication control unit 32 enters into the enabled mode of all-sector communication of FIG. 3A, in which it sequentially communicates with all of the wireless terminals 21 to 33 in the sectors #1 to #8, using all of the transceivers 302 to 316, to detect current locations of the wireless terminals in the respective sectors. For this purpose, under the control of the communication control unit 32, the transceivers 302 to 316 polls the wireless terminals 21 to 33 with using a location determining packet to allow them to sequentially send responses. In accordance with the identification of the transceiver (e.g., the transceiver 302) of the base station 10 that has received the response, it is determined which one of the sectors (e.g., the sector #1 ) the wireless terminal (e.g., the terminal 21) that has sent the response is located in, and then the identification code of the wireless terminal located in the determined sector is recorded in the location management table 324.

When two adjacent transceivers receive a response from the same wireless terminal, the communication control unit 32 may determine which one of the sectors the wireless terminal is located in, in accordance with the received power levels of the received RF signals from the same wireless terminal in the respective transceivers. Alternatively, the communication control unit 32 may determine which one of the sectors the wireless terminal is currently located in, in view of the sector in which the wireless terminal is previously located. For example, the sector which the wireless terminal is previously located in may be determined as the current sector. Alternatively, it may be predicted that the wireless terminal will move from one of the sectors to the other sector, and for example the other sector may be determined as the current sector.

At Step 506, in the last portion of the period of time to in the mode of all-sector communication and before the switching time, the communication control unit 32 causes the wireless transceivers 304, 308, 312 and 316 to broadcast a switching packet indicative of disabling communication to the wireless terminals 22, 23, 26, 29, 32 and 33 in the even-numbered sectors #2, #4, #6 and #8. The switching packet contains data indicating the time when the next enabled mode of communication is established, such as the length of the period of disabled communication, the length of the period of time to be elapsed before the communication resumes, or time of the day when the communication resumes.

At Step 508, the communication control unit 32 disables the transceivers 304, 308, 312 and 316 from transmitting an RF signal in the even-numbered sectors #2, #4, #6 and #8, so that communications between the transceivers 304, 308, 312 and 316 and the wireless terminals 22, 23, 26, 29, 32 and 33 are disabled. In the odd-numbered sectors #1, #3, #5 and

7, the transceivers 302, 306, 310 and 314 transmit and receive data to and from the wireless terminals 21, 24, 25, 27, 28, 30 and 31. When the transceivers 302, 306, 310 and 314 receive the RF signals from the wireless terminals in the sectors #1, #3, #5 and #7, the communication control unit 32 determines which ones of the sectors the wireless terminals are located in, in accordance with the identification codes of the wireless terminals. When the wireless terminal has changed its location in the sectors, the communication control unit 32 updates the location management table 324.

At Step 510, similarly to the operation in Step 506, in the last portion of the period of time $t_1$ during which the odd-numbered sectors #1, #3, #5 and #7 are in the enabled mode of communication, and before the switching time, the communication control unit 32 causes the wireless transceivers 302, 306, 310 and 314 to broadcast a switching packet indicative of disabling transmission to the wireless terminals 21, 24, 25, 27, 28, 30 and 31 in the odd-numbered sectors #1, #3, #5 and #7.

At Step 512, similarly to the operation in Step 508, the communication control unit 32 disables the transceivers 302, 306, 310 and 314 from transmitting an RF signal in the odd-numbered sectors #1, #3, #5 and #7, so that communications between the transceivers 302, 306, 310 and 314 and the wireless terminals 21, 24, 25, 27, 28, 30 and 31 are disabled. In the even-numbered sectors #2, #4, #6 and #8, the transceivers 304, 308, 312 and 316 transmit and receive data to and from the respective wireless terminals 22, 23, 26, 29, 32 and 33.

At Step 514, the communication control unit 32 determines whether Steps 506 to 514 have been repeatedly executed a predetermined number, M, of times. The predetermined number M is an arbitrary integer of one or larger. As the predetermined number M becomes larger and hence the frequency of occurrences of the mode of all-sector communication becomes lower, the efficiency of communication becomes higher. On the other hand, as the predetermined number M becomes smaller and hence the frequency of occurrences of the mode of all-sector communication becomes higher, the number of wireless terminals whose current locations in the sectors are not known because of the movement between the sectors becomes smaller. If it is determined that the steps have not been repeatedly executed the predetermined number of times, the procedure returns to Step 504. If it is determined that the steps have been repeatedly executed the predetermined number of times, the communication control unit 32 at Step 516 switches all the transceivers 302 to 316 to enter the enabled mode of all-sector communication of FIG. 4A. Thereafter, the procedure returns to Step 504.

When a wireless terminal is moved from a sector in the disabled mode of communication, in which it has been located, into another sector in the enabled mode of communication, and the moved wireless terminal in the sector in the enabled mode of communication further transmits a signal to the transceiver, the communication control unit 32 detects the movement or location of the wireless terminal in accordance with its identification code contained in the transmitted signal, and updates the location management table 324.

When a wireless terminal is moved from one sector in the enabled mode of communication, in which it has been located for a while, to another sector in the disabled mode of communication, and even if the communication control unit 32 tries to transmit data via the transceiver to the wireless terminal previously located in the sector in the enabled mode of communication, the communication control unit 32 cannot receive a response from it, and hence cannot determine the location of the wireless terminal. In this case, as shown in FIG. 2C, the communication control unit 32 prepares a list of wireless terminals whose current locations in the sectors are not known. Thereafter, when all of the sectors are in the enabled mode of all-sector communication, the communication control unit 32 preferentially transmits a packet for determining the locations to the wireless terminals whose locations cannot have been determined, or polls the wireless terminals to cause them to send responses, to thereby detect the movement or locations of the wireless terminals. The location management table 324 is then updated. Thereafter, if the location of the wireless terminal cannot be determined, the identification code of the wireless terminal is deleted from the table 324 immediately or after elapse of a predetermined period of time.

Figure 6:
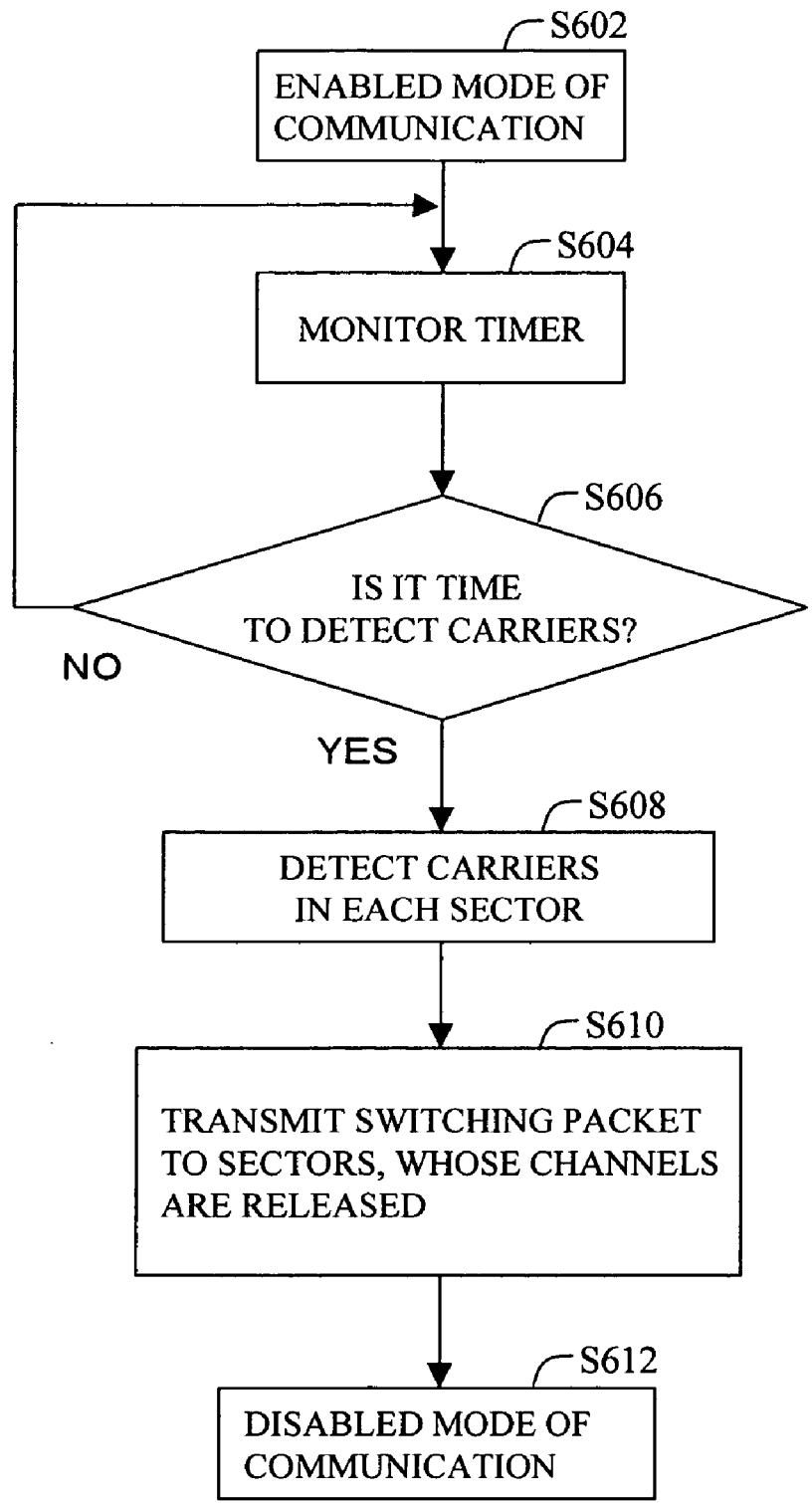
FIG. 6 shows in more detail a part of the communication procedure in FIG. 5 implemented by the communication control unit.

FIG. 6 shows in more detail the communication procedure of Steps 506 and 510 in FIG. 5 executed by the communication control unit 32.

Figure 7:
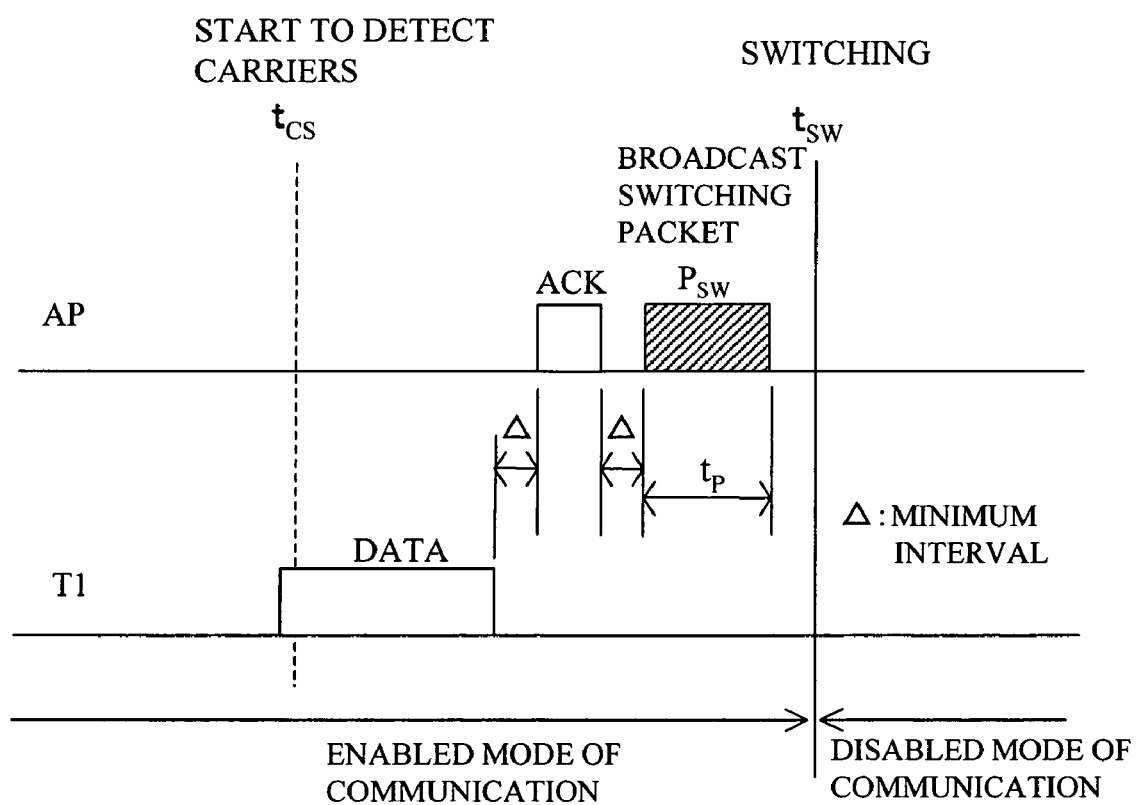
FIG. 7 is a partial time chart around a switching time between two adjacent periods of time of the first to fifth periods of time.

FIG. 7 is a partial time chart around a switching time $t_{SW}$ between two adjacent periods of time of the first to fifth periods of time $t_0$ to $t_4$. In the figure, the symbol $\Delta$ represents the minimum time interval between transmitted and received packets.

At Step 602, every second sectors, i.e. odd-numbered or even-numbered sectors, have already been in the enabled mode of communication. At Step 604, the communication control unit 32 monitors a timer. At Step 606, the communication control unit 32 determines whether or not it is time to start carrier detection, i.e., whether or not it is a predetermined length of time $(t_{SW}-t_{CS})$ before the switching time $t_{SW}$. If it is determined that it is not time to start carrier detection, the procedure returns to Step 604 and Steps 604 and 606 are repeated until it becomes time to start carrier detection.

If it is determined at Step 606 that it is time $t_{CS}$ to start the carrier detection, the communication control unit 32 starts at Step 608 to detect carriers transmitted from the wireless terminals in the sectors in the enabled mode of communication, and also from transmitters of the transceivers, at the predetermined time $t_{CS}$, using receivers of the transceivers. Thus the free or available condition of the channels or lines, or the occupied condition of the communication medium (the frequency band) is determined.

If it is determined at Step 610 that no carrier or the RF signal is transmitted in each sector, the communication control unit 32 broadcasts a packet $P_{SW}$ indicative of switching from the enabled mode of communication to the disabled mode of communication, to the wireless terminals in the sectors, when the carrier is not detected, or when the minimum time interval $\Delta$ elapses after the carrier is not detected. The communication control unit 32 completes the broadcasting of the switching packet $P_{SW}$ before the switching time $t_{SW}$ at the latest. Accordingly, the time $t_{CS}$ of detecting the carrier is determined so that the length of time $(t_{SW}-t_{CS})$ is longer than the length of time (the maximum packet length+the length of an ACK packet+$t_p$+3×$\Delta$). While a certain wireless terminal transmits signals at the minimum packet intervals $\Delta$ (e.g., in fragmentation), The communication control unit 32 transmits the switching packet $P_{SW}$ instead of transmitting an ACK back. When the wireless terminal next enters into the enabled mode of communication of FIG. 4B or 4C, it retransmits the data which it has been failed to transmit. At Step 612, the wireless terminal which receives the switching packet is disabled from transmitting a signal to the transceiver or from accessing the base station 10 during the next period of time $t_{i+1}$, or until the further next period of time $t_{i+2}$.

Figure 8:
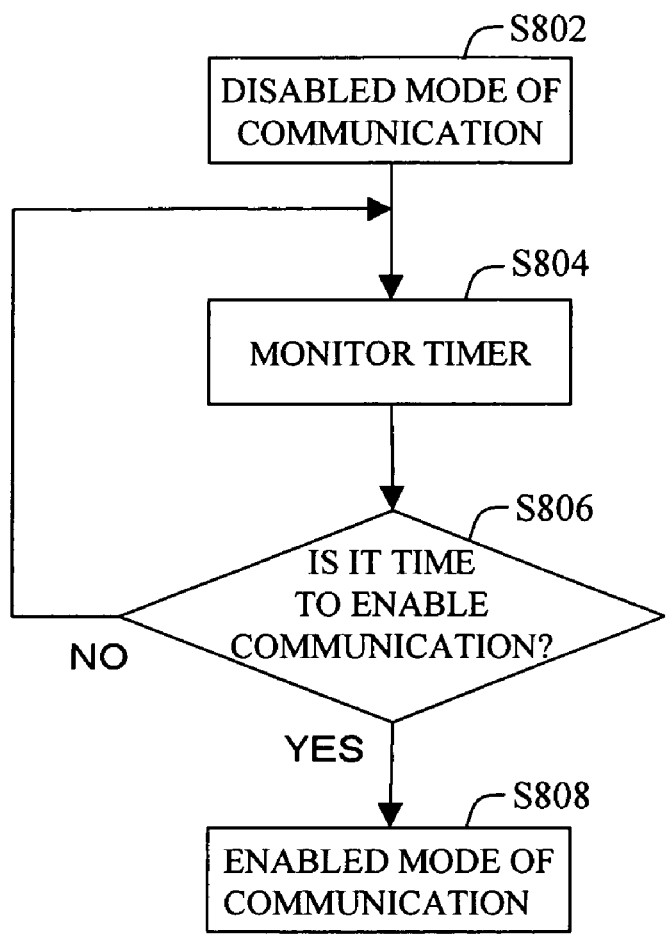
FIG. 8 shows in more detail the control procedure of FIG. 5 implemented by the communication control unit and the wireless terminals.

FIG. 8 shows in more detail the control procedure of Steps 506, 510 and 516 of FIG. 5 executed by the communication control unit 32 and the wireless terminals 21 to 33.

At Step 802, the even-numbered or odd-numbered sectors are already in the disabled mode of communication. At step 804, the communication control unit 32 and the wireless terminals in these sectors monitor their respective timers. At Step 806, it is determined whether or not it is time to start the enabled mode of communication, with reference to information on the period of disabled communication or the time to resume communication which is designated in the received switching packet $P_{SW}$. If it is determined that it is not time to start the enabled mode of communication, the procedure returns to Step 804, and Steps 804 and 806 are repeated until it becomes time to start the enabled mode of communication.

If it is determined at Step 806 that it is time to start the enabled mode of communication, the communication control unit 32 and the wireless terminals enable at Step 808 communications in the even-numbered or the odd-numbered sectors.

Figure 9:
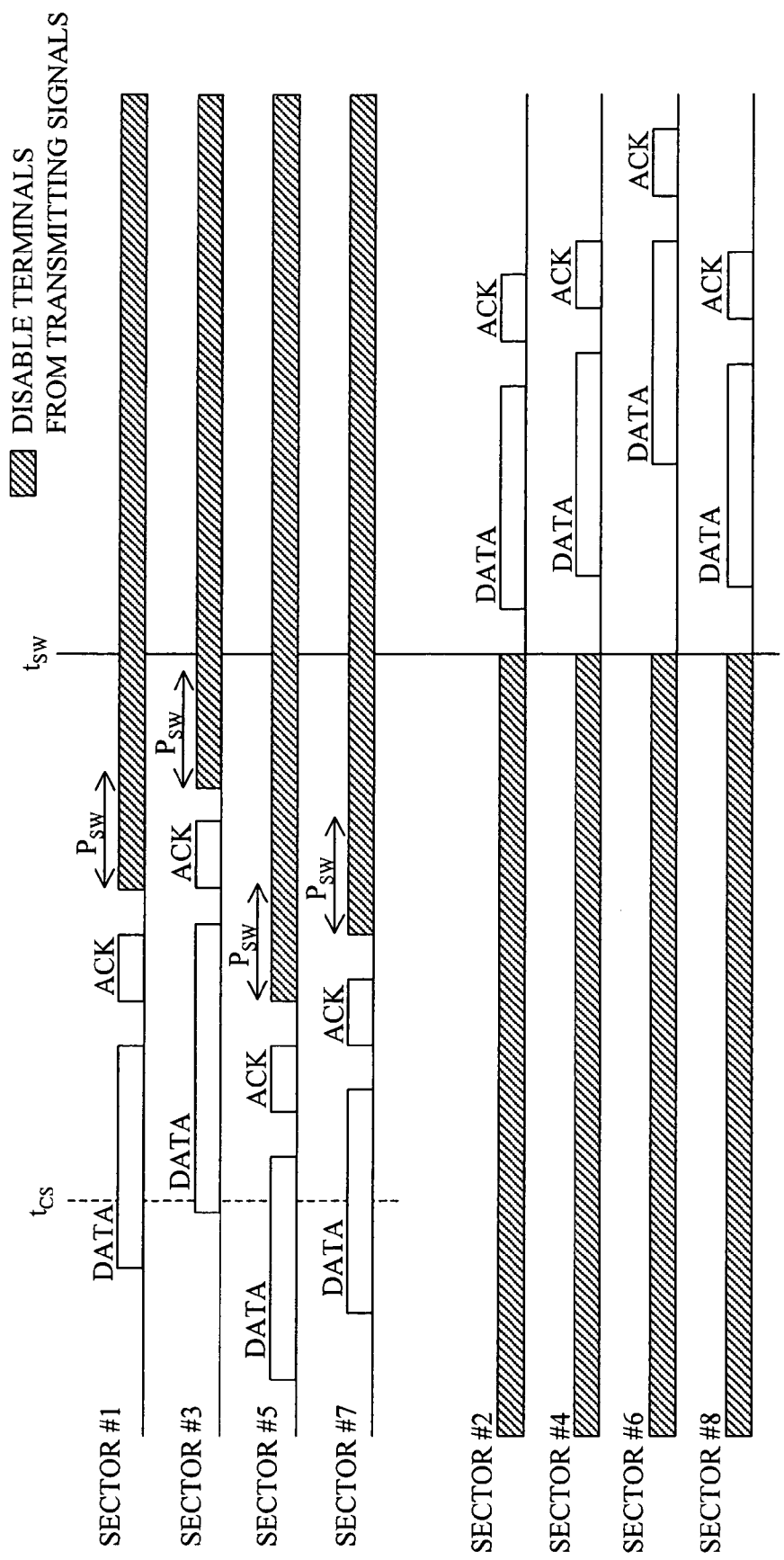
FIG. 9 shows the communication conditions in the vicinity of the switching time between the enabled mode of communication and the disabled mode of communication in the sectors.

FIG. 9 shows the communication conditions around the switching time $t_{SW}$ between the enabled mode of communication and the disabled mode of communication in the sectors #1 to #8. In each of the sectors #1, #3, #5 and #7 in the enabled mode of communication, each of the transceivers 302, 306, 310 and 316 transmits and receives data to and from one wireless terminal in the sector at an arbitrary time. Then the ACK is transmitted back. In the sectors #1, #3, #5 and #7, at the carrier detection time $t_{CS}$, the transceivers in the respective sectors start the detection of the received carriers. After the ACK is transmitted back, the communication control unit 32 causes the corresponding transceivers in the sectors to broadcast the switching packet $P_{SW}$ for switching between the periods of time.

Accordingly, the transceivers and the wireless terminals in the sectors of the enabled mode of communication stop transmission before the switching time $t_{SW}$.

The sectors in the disabled mode of communication enter into the enabled mode of communication after the switching time $t_{SW}$, so that the transceivers and the wireless terminals in the sectors resume transmission and reception.

The above-described embodiments are only typical examples, and their modifications and variations are apparent to those skilled in the art. It should be noted that those skilled in the art can make various modifications to the above-described embodiments without departing from the principle of the invention and the accompanying claims.

What is claimed is:

1. An apparatus for a wireless base station for use in a wireless local area network (LAN) sharing one frequency channel, said apparatus being adapted to communicate with a plurality of wireless terminals in a plurality of sectors, said apparatus comprising:

a communication control unit, and a plurality of transceivers associated with said sectors, respectively, said transceivers having respective directive antennas associated with said respective sectors, wherein, during a first period of time, said communication control unit causes all of said transceivers in all of said sectors to transmit and receive RF signals at said frequency channel to and from said plurality of wireless terminals, determines locations of said wireless terminals in the sectors, in accordance with identification codes of said wireless terminals and with identifications of said transceivers which receive said identification codes, and stores, in a location management table, information indicating which wireless terminals are located in each sector, during a second period of time subsequent to said first period of time, said communication control unit enables one or more of said plurality of transceivers that are associated with respective one or more of said plurality of sectors that are not adjacent to each other, to transmit and receive RF signals at said frequency channel to and from wireless terminals, and said communication control unit disables remaining one or more transceivers other than said enabled one or more transceivers, from transmission to wireless terminals, and during a third period of time subsequent to said second period of time, said communication control unit enables further one or more of said plurality of transceivers that are associated with respective further one or more of said plurality of sectors that are not adjacent to each other, to transmit and receive RF signals at said frequency channel to and from wireless terminals, said further one or more transceivers being disabled in said second period of time from transmitting, and said communication control unit disables further remaining one or more transceivers other than said enabled further one or more transceivers, from transmission to wireless terminals, wherein time periods associated with said second period of time and time periods associated with said third period of time are sequentially and alternately executed, a predetermined length of time before the change from a time period associated with said second period of time to a time period associated with said third period of time, said transceiver which is enabled to transmit and receive RF signals starts detection of an RF signal transmitted by a wireless terminal located in a corresponding sector, and broadcasts a packet indicative of disabling transmission between said transceiver and wireless terminals in said corresponding sector during said third period of time and indicative of a length of said third period of time to wireless terminals in said corresponding sector, during which said transceiver does not receive an RF signal, wherein said transceiver broadcasts said packet in response to said transceiver not detecting a transmitted RF signal, and wherein, in response to said transceiver detecting a transmitted RF signal, said transceiver broadcasts said packet after completion of transmission of the transmitted RF signal, a predetermined length of time before the change from a time period associated with said third period of time to a time period associated with said second period of time, said transceiver which is enabled to transmit and receive RF signals starts detection of an RF signal transmitted by a wireless terminal located in a corresponding sector, and broadcasts a packet indicative of disabling transmission between said transceiver and wireless terminals in said corresponding sector during said second period of time and indicative of a length of said second period of time to wireless terminals in said corresponding sector, during which said transceiver does not receive an RF signal, wherein said transceiver broadcasts said packet in response to said transceiver not detecting a transmitted RF signal, and wherein, in response to said transceiver detecting a transmitted RF signal, said transceiver broadcasts said packet after completion of transmission of the transmitted RF signal, and the communication control unit determines whether time periods associated with said second period of time and time periods associated with said third period of time have been sequentially and alternately executed a predetermined number of times and executes a time period associated with said first period of time based on said determination.

2. The apparatus according to claim 1, wherein, during said first period of time, said communication control unit causes all of said transceivers to transmit, in all of said sectors, a packet addressed to one of said wireless terminals, whose current location in the sectors is unknown.

3. The apparatus according to claim 1, wherein, during said second period of time, in one of said plurality of sectors, when one of said plurality of transceivers receives an identification code of one of said plurality of wireless terminals which has been located in another sector, from said one wireless terminal, said communication control unit stores said identification code of said one wireless terminal into said location management table in association with said one sector.

4. A wireless terminal for use in a wireless LAN sharing one frequency channel, said wireless terminal being adapted to communicate with a wireless base station in any one of a plurality of sectors, said wireless terminal comprising:

a control unit and a transceiver, wherein said control unit causes said transceiver to transmit a response packet containing an identification code of said wireless terminal to said wireless base station in response to a polling packet received from said wireless base station during a first period of time, said control unit causes said transceiver to transmit and receive RF signals at said frequency channel to and from said wireless base station during a second period of time, said control unit allows said transceiver to receive a broadcast packet indicative of disabling of transmission during a third period of time subsequent to said second period of time and indicative of a length of said third period of time , when said transceiver does not transmit an RF signal, and disables said transceiver from transmission during said third period of time, time periods associated with said second period of time and time periods associated with said third period of time are sequentially and alternately executed, and said control unit causes executes a time period associated with said first period of time based on whether time periods associated with said second period of time and time periods associated with said third period of time have been sequentially and alternately executed a predetermined number of times.

5. A computer readable medium encoded with a computer program for an apparatus for a wireless base station for a wireless LAN sharing one frequency channel, said apparatus being adapted to communicate with a plurality of wireless terminals in a plurality of sectors, said program being operable to effect:

during a first period of time, causing all of a plurality of transceivers in all of said sectors to transmit and receive RF signals at said frequency channel to and from said plurality of wireless terminals, determining locations of said wireless terminals in said sectors, in accordance with identification codes of said transceivers which receive said identification codes, and storing, in a location management table, information indicating which wireless terminals are located in each sector, during a second period of time subsequent to the first period of time, enabling one or more of said plurality of transceivers that are associated with respective one or more of said plurality of sectors that are not adjacent to each other, to transmit and receive RF signals at said frequency channel to and from wireless terminals, and disabling remaining one or more transceivers other than said enabled one or more transceivers, from transmission to wireless terminals; and during a third period of time subsequent to said second period of time, enabling further one or more of said plurality of transceivers that are associated with respective further one or more of said plurality of sectors that are not adjacent to each other, to transmit and receive RF signals at said frequency channel to and from wireless terminals, said further one or more transceivers being disabled in said second period of time from transmission, and disabling further remaining one or more transceivers other than said enabled further one or more transceivers, from transmission to wireless terminals, wherein time periods associated with said second period of time and time periods associated with said third period of time are sequentially and alternately executed, a predetermined length of time before the change from a time period associated with said second period of time to a time period associated with said third period of time, said transceiver which is enabled to transmit and receive RF signals starts detection of an RF signal transmitted by a wireless terminal located in a corresponding sector, and broadcasts a packet indicative of disabling transmission between said transceiver and wireless terminals in said corresponding sector during said third period of time and indicative of a length of said third period of time to wireless terminals in said corresponding sector, during which said transceiver does not receive an RF signal, wherein said transceiver broadcasts said packet in response to said transceiver not detecting a transmitted RF signal, and wherein, in response to said transceiver detecting a transmitted RF signal, said transceiver broadcasts said packet after completion of transmission of the transmitted RF signal, a predetermined length of time before the change from a time period associated with said third period of time to a time period associated with said second period of time, said transceiver which is enabled to transmit and receive RF signals starts detection of an RF signal transmitted in a corresponding sector, and broadcasts a packet indicative of disabling transmission between said transceiver and wireless terminals in said corresponding sector during said second period of time and indicative of a length of said second period of time to wireless terminals in said corresponding sector, during which said transceiver does not receive an RF signal, wherein said transceiver broadcasts said packet in response to said transceiver not detecting a transmitted RF signal, and wherein, in response to said transceiver detecting a transmitted RF signal, said transceiver broadcasts said packet after completion of transmission of the transmitted RF signal, and the communication control unit determines whether time periods associated with said second period of time and time periods associated with said third period of time have been sequentially and alternately executed a predetermined number of times and executes a time period associated with said first period of time based on said determination.

6. A method for communication in an apparatus for a wireless base station for a wireless LAN sharing one frequency channel, said apparatus being adapted to communicate with a plurality of wireless terminals in a plurality of sectors, said method comprising:

during a first period of time, causing all of a plurality of transceivers in all of said sectors to transmit and receive RF signals at said frequency channel to and from said plurality of wireless terminals, determining locations of said wireless terminals in said sectors, in accordance with identification codes of said transceivers which receive said identification codes, and storing, in a location management table, information indicating which wireless terminals are located in each sector, during a second period of time subsequent to the first period of time, enabling one or more of said plurality of transceivers that are associated with respective one or more of said plurality of sectors that are not adjacent to each other, to transmit and receive RF signals at said frequency channel to and from wireless terminals, and disabling remaining one or more transceivers other than said enabled one or more transceivers, from transmission to wireless terminals; and, during a third period of time subsequent to said second period of time, enabling further one or more of said plurality of transceivers that are associated with respective further one or more of said plurality of sectors that are not adjacent to each other, to transmit and receive RF signals at said frequency channel to and from wireless terminals, said further one or more transceivers being disabled in said second period of time from transmission, and disabling further remaining one or more transceivers other than said enabled further one or more transceivers, from transmission to wireless terminals, wherein time periods associated with said second period of time and time periods associated with said third period of time are sequentially and alternately executed, a predetermined length of time before the change from a time period associated with said second period of time to a time period associated with said third period of time, said transceiver which is enabled to transmit and receive RF signals starts detection of an RF signal transmitted by a wireless terminal located in a corresponding sector, and broadcasts a packet indicative of disabling transmission between said transceiver and wireless terminals in said corresponding sector during said third period of time and indicative of a length of said third period of time to wireless terminals in said corresponding sector, during which said transceiver does not receive an RF signal, wherein said transceiver broadcasts said packet in response to said transceiver not detecting a transmitted RF signal, and wherein, in response to said transceiver detecting a transmitted RF signal, said transceiver broadcasts said packet after completion of transmission of the transmitted RF signal, a predetermined length of time before the change from a time period associated with said third period of time to a time period associated with said second period of time, said transceiver which is enabled to transmit and receive RF signals starts detection of a transmitted RF signal in a corresponding sector, and broadcasts a packet indicative of disabling transmission between said transceiver and wireless terminals in said corresponding sector during said second period of time and indicative of a length of said second period of time to wireless terminals in said corresponding sector, during which said transceiver does not receive an RF signal, wherein said transceiver broadcasts said packet in response to said transceiver not detecting a transmitted RF signal, and wherein, in response to said transceiver detecting a transmitted RF signal, said transceiver broadcasts said packet after completion of transmission of the transmitted RF signal, and the communication control unit determines whether time periods associated with said second period of time and time periods associated with said third period of time have been sequentially and alternately executed a predetermined number of times and executes a time period associated with said first period of time based on said determination.

7. A method for communication in a wireless terminal for a wireless LAN sharing one frequency channel, having a transceiver, said wireless terminal being adapted to communicate with a wireless base station in any one of a plurality of sectors, said method comprising:

causing said transceiver to transmit a response packet containing an identification code of said wireless terminal to said wireless base station in response to a polling packet received from said wireless base station during a first period of time, causing said transceiver to transmit and receive RF signals at said frequency channel to and from said wireless base station during a second period of time, causing said transceiver to receive a broadcast packet indicative of disabling of transmission during a third period of time subsequent to said second period of time and indicative of a length of said third period of time, when said transceiver does not transmit an RF signal, disabling said transceiver from transmission during said third period of time, determining whether time periods associated with said second period of time and time periods associated with said third period of time have been sequentially and alternately executed a predetermined number of times, and executing a time period associated with said first period of time based on whether time periods associated with said second period of time and time periods associated with said third period of time have been sequentially and alternately executed said predetermined number of times.

8. An apparatus for a wireless base station for use in a wireless local area network (LAN), said apparatus being adapted to communicate with a plurality of wireless terminals in a plurality of sectors, said apparatus comprising:

a plurality of transceivers associated with said sectors, respectively, wherein during a first period of time, all of said transceivers in all of said sectors to transmit and receive RF signals to and from said plurality of wireless terminals, during a second period of time subsequent to said first period of time, one or more of said plurality of transceivers that are associated with respective one or more of said plurality of sectors that are not adjacent to each other, are enabled to transmit and receive RF signals at said frequency channel to and from wireless terminals, and remaining one or more transceivers other than said enabled one or more transceivers, are disabled from transmission to wireless terminals, and during a third period of time subsequent to said second period of time, further one or more of said plurality of transceivers that are associated with respective further one or more of said plurality of sectors that are not adjacent to each other, are enabled to transmit and receive RF signals at said frequency channel to and from wireless terminals, said further one or more transceivers being disabled in said second period of time from transmitting, and further remaining one or more transceivers other than said enabled further one or more transceivers, are disabled from transmission to wireless terminals, wherein time periods associated with said second period of time and time periods associated with said third period of time are sequentially and alternately executed, and time periods associated with said second period of time and time periods associated with said third period of time are sequentially and alternately executed a predetermined number of times and a time period associated with said first period of time is subsequently executed.

* * * * *